United States Patent Office 2,853,478
Patented Sept. 23, 1958

2,853,478

SEPARATION OF UREA ADDUCTS

Werner Stein and Helmut Hartmann, Dusseldorf-Holthausen, Germany, assignors to Henkel & Cie., G. m. b. H., Dusseldorf-Holthausen, Germany, a German corporation No Drawing. Application July 19, 1954
Serial No. 444,352

Claims priority, application Germany July 24, 1953

5 Claims. (Cl. 260—96.5)

This invention relates to improvements in the separation of urea adducts.

It is known that urea will selectively form addition compounds termed "adducts" with certain organic compounds, such as those having a straight chain molecular structure containing at least six carbon atoms in the molecule. As contrasted to this, adducts will generally not form or only form with difficulty in connection with compounds having branched chain double bonds or ring systems in the molecule.

This selective adduct-forming property of urea has been utilized for the separation of the higher straight chain components from other components in organic mixtures. Generally the mixture to be separated is treated with urea as such, the urea dissolved in water or a suitable organic solvent. The components which form the adducts with the urea are separated with the urea from the non-adduct-forming components by sedimentation or filtration. During this separation, and particularly when the same is effected on an industrial scale, certain difficulties arise, due to the fact that the products frequently settle out to slowly and/or are not readily filterable. These difficulties may be so substantial that the effecting of the method industrially becomes impossible. In the case of filtration, a clogging of the filter may readily occur, due to the fine, solid, adducts.

The various operating and reaction conditions and the mixtures which may be separated by urea-adduct formation have been well described in the art.

One object of this invention is to overcome the above-mentioned difficulties in the separation of the urea adducts from the non-adduct-forming components in the separation of organic mixtures by urea-adduct-formation. This, and still further objects, will become apparent from the following description:

In accordance with the invention, it has been found that the urea adducts may be readily separated from the non-adduct-forming components by forming a dispersion of the solid adducts and the non-adduct-forming liquids in an aqueous solution having a specific gravity at least equal to that of the solid adducts and centrifugally rotating the dispersion in an outwardly confined centrifugal zone, i. e., a solid jacket centrifuge to thereby form a lighter phase, which contains the liquid, non-adduct-forming components, and a heavier phase which contains the solid adducts suspended in the aqueous solution. The heavier phase containing the solid adducts suspended in aqueous solution may be readily treated for the recovery of the adduct-forming components of the mixture initially treated, as, for example, by heating the suspension and recovering the oily layer of the adduct-forming components thus formed.

The dispersion containing the solid adducts and liquid, non-adduct-forming components of the mixture are preferably formed by mixing the mixture to be separated with an aqueous urea solution having a specific gravity at least equal to that of the solid urea adducts which will be formed.

The centrifugal separation of the dispersion is preferably effected in an imperforate type centrifuge, and preferably one provided with stripping or peeling discs.

The aqueous solution of the given specific gravity will, for the sake of simplicity, be called the heavy liquid, the mixture components obtained from the solid adducts will be called the extract, and the non-added mixture components will be called the residual oil.

There is extensive literature concerning the manner of separating mixtures of organic compounds in accordance with the urea adduct formation method, the formation of urea adducts and the nature of the products which are capable and not capable of forming adducts. According to this literature, an addition takes place when the compounds have an elongated preferably straight-chain molecular structure and contain at least 6 carbon atoms in the molecule. Branched chains, double bonds, or ring systems in the molecule generally make the formation of the adduct difficult or entirely impossible. On the other hand, the chemical nature of the mixture of organic substances is essentially without influence on the formation of the adduct. Thus the method of separation can be applied, for example, to hydrocarbons, alcohols, ketones, carboxylic acids, esters, etc. It is also possible to work mixtures of different types of chemical compounds. In connection with the non-added part of the mixture, there can be concerned compounds which are not capable at all of forming adducts as well as compounds which, while they can form urea adducts, do not combine with urea to form adducts under the operating conditions selected.

It has already been pointed out that the possibility of carrying out the method is not limited to mixtures of material of given chemical classes, but only to whether components of the mixture which is to be worked have a different ability to form additions with urea. The source of the material being worked is, therefore, immaterial. Hydrocarbons which are to be worked can be directly of natural origin or obtained by the further working of natural products or synthetically, for example, by carbon monoxide hydrogenation. Also treated products of all these hydrocarbons in connection with which hetero atoms and hetero-atom groups are introduced into the hydrocarbon molecule, possibly with a change in the molecular size, can be used as starting material in raw or prepared condition. Such products are, for example, the halogenation, nitration, or oxidation products of hydrocarbons, in which connection the latter can be primary, secondary, and tertiary alcohols, aldehydes, ketones, or carboxylic acids. Mixtures of such conversion products of hydrocarbons can also be worked. Fat products, within the widest meaning of the term, also are of importance as starting materials. There are understood thereby substances preferably of natural origin which occur in fats or can be recovered from fats such as fatty acids, fatty alcohols, fatty acid-fatty alcohol esters, etc. They can be saturated or unsaturated and come from micro-organisms, plant, land, and water animals. Furthermore, this group also includes all substances which can be produced in any desired manner by the conversion of the functional groups of fat substances, and particularly of the carboxyl group. The carboxyl group can in this connection be reduced to the hydroxyl group, esterified, converted into an amide or nitrile group, etc. Mixtures of synthetic fatty acids or fatty alcohols or their above-indicated derivatives can also be separated in accordance with the method of the invention. The method of the invention is of particular importance, however, for all those industrial products which are present from the very start as mixtures of adduct-forming and non-adduct forming compounds or in connection with which the adduct-forming ability of components of the mixture is changed during the course of the working, for example, by change of the degree of branching. Processes in connection with which straight-chain or branch-chain products are produced at the very start include, for example, the various methods of hydrogenating oxides of carbon, in which connection either hydrocarbons or mixtures of hydrocarbons with oxygen-containing compounds can be preferentially obtained. Also natural hydrocarbon mixtures for example, mixtures of aromatics, preferably straight chain aliphatics or mixtures of fatty and resinic acids, belong to this group of substances. As processes in connection with which the degree of branching of the starting materials used changes, there may be mentioned the methods in which carbon monoxide is added to olefins together with a further reactant, for example, hydrogen, water, alcohols, ammonia, or amines. In this connection, aldehydes, fatty acids, fatty acid esters, and possibly substituted amides are obtained, depending on the other reactant. In addition to these primary products, the products obtained from their further working by reduction, oxidation, saponification, esterification, etc., can also be worked. This enumeration makes no claim to completeness; it is merely intended to point out on basis of examples, the materials of substances to which the method can be applied.

The method of the present invention is applicable to mixtures of urea adducts and non-added compounds, which are prepared in accordance with any method. If these mixtures do not contain any water or excessively small quantities thereof, they are dispersed in the necessary quantity of heavy liquid. If these mixtures contain insufficient water or aqueous urea solution, there can be dissolved therein substances which impart the desired specific gravity to the aqueous phase, or else these mixtures can be mixed with concentrated heavy liquid. As is well known, urea adducts split up into their component parts upon contact with water or insufficiently concentrated aqueous urea solutions. Thus, if urea adducts are brought together with a heavy liquid which does not contain any or only a small amount of urea dissolved in it, they may break up or only partially break up.

In order to prepare the heavy liquid, there are preferably used inorganic electrolytes, particularly salts. They should have a high solubility in water and/or contain heavy atoms or atom groups.

There may be used in particular, the water-soluble salts of alkalis, alkali earths, light or heavy metals, particularly mono- to trivalent metals. These salts include, for example, the chlorides, sulfates, nitrates, or acetates of ammonium, sodium, potassium, magnesium, calcium, barium, zinc, lead, or aluminum insofar as they are water-soluble. There may also be used salts of organic bases such as, for example, of methyl-, ethyl- or alkylol amines. Finally, there can be used any mixtures of such salts, provided that no precipitates are produced upon the mixing. The dissolved salts must, of course, be inert with respect to the mixture of materials which is to be separated.

The specific gravity of the heavy liquid should be at least so great that the urea adducts do not sink in the liquid. Since the specific gravity of the liquid changes upon the formation of the urea adducts or upon the partial decomposition of completely formed urea adducts due to the change of the urea content, the specific gravity of the liquid in equilibrium with the urea adducts is controlling.

The specific gravity of the urea adducts lies in the range from 1.2 to 1.3. The specific gravity of the heavy liquid should therefore be at least 1.2 to 1.3; the upper limit is established not by the method itself, but by the specific gravity which can be obtained in the case of an aqueous solution. In general, good results are obtained with specific gravities in the range from 1.2 to 1.4.

Although the preparation of the urea adducts as such is not considered new, their method of formation in connection with the carrying out of the method of the present invention will nevertheless be described, inasmuch as the preparation of the adducts and the preparation of the dispersion frequently combined therewith can influence the separation. Accordingly, the sharpness of separation of the method is dependent not only on the separation of the dispersion, but also on the method of preparation of the urea adducts. Therefore, all procedural steps which influence the development of the urea adducts must be adapted to the specific purpose of the method. The formation of the adducts with the use of an aqueous heavy liquid is, however, new, and therefore is of independent inventive nature.

If the adducts are not present in fully formed condition, the preparation of the dispersion is advisedly combined with the formation of the adducts by mixing the heavy liquid containing the urea with the liquid mixture of the substances to be separated. Otherwise conventional methods are used.

The conditions of these conventional methods are generally known from the literature. Thus, for example, the quantity ratio of mixture of substances to be separated and urea is of importance. Mixtures of adduct-forming substances can also be separated, provided the components of the mixture have different addition powers, and if less urea is used than is necessary under the reaction conditions selected, for the complete conversion of the mixture of materials to be separated into adducts. The mixture of urea adducts and non-added compounds which is to be prepared, can be influenced by varying the urea concentration of the aqueous solution used. The minimum concentration is about 40% urea in the heavy liquid, in which connection it is to be noted that this minimum concentration is strongly dependent on the other conditions while the maximum concentration is a practically completely saturated urea solution, in which connection it is possible to operate in the presence of undissolved urea. The quantity of undissolved urea can be so great that a saturated urea solution is still present after the formation of the urea adducts. By varying the reaction time, the formation of urea adducts, the dispersion condition and thus the separating effect, can also be controlled. The time between the addition of urea solution to the mixture of organic materials and the breaking of the dispersion in the centrifuge can vary from minutes up to a few hours, depending on the additive ability of the organic compounds.

Since the urea adducts become less stable with increasing temperature, the temperature at which the urea adducts are prepared and their separation from the non-added components effected, or the change in the temperature during the carrying out of the process, is also of importance.

The mechanical working of the dispersion also influences the nature of the products obtained by the method. If the dispersion is prepared continuously, for example, by the joint cooling of urea solution and of the mixture to be separated, this can be done in agitating vessels, mixers, or in a so-called scraper cooler, i. e., a tube surrounded by a cooling jacket, the wall of which is passed over by scraper arms and in this way kept free of the adducts which would otherwise deposit thereon. Should the adduct crystals prove to be too large, the adducts can be comminuted as such or in the form of a dispersion in comminuting, emulsifying, or homogenizing apparatus.

In the literature on the preparation of urea adducts, there are proposals to work in the presence of organic water-soluble or water-insoluble solvents which as such are not able to form adducts. There are generally concerned in this connection hydrocarbons, halogen hydrocarbons, alcohols, ketones, or esters having less than six carbon atoms in the molecule. They dilute the portion of the mixture to be separated which is not capable of forming adducts, and in various cases by themselves make possible the formation of the adduct and facilitate the separation of the non-added organic substance from the solid adduct. Insofar as water-soluble solvents are used as addition agents, their quantity is kept less than 50% by weight of the heavy liquid. In particular, it should be seen to it that no salts are precipitated by the use of such solvents. The use of solvents makes possible in particular the working of mixtures of materials which are solid at the separation temperature.

Another variant of the method consists in adding surface-active substances. By surface-active substances, a large number of which of the most different types is known, there are understood organic compounds which contain hydrophobic and hydrophilic groups in the molecule, and, when added to the system, reduce the interfacial tension between the aqueous medium and the organic components. Such compounds contain non-aromatic hydrocarbon radicals with 8 to 20 and preferably 12 to 18 carbon atoms and salt-forming or non-salt-forming water-solubilizing groups. As examples of surface-active substances having acid, water-solubilizing groups, there may be mentioned alkylbenzolsulfonates, alcoholsulfates, alkylsulfonates, sulfated fatty acid monoglycerides, as well as soaps, particularly the soaps of organic bases such as, for example, mono-, di-, or triethanolamine. Surface-active substances having basic water-solubilizing groups are known as cation-active compounds. Those with quaternary nitrogen atoms, for example, the alkylpyridinium salts, are of particular importance. As examples of surface-active substances with non-salt-forming, water-solubilizing groups there may be mentioned, alkyleneoxide addition products to higher molecular compounds with mobile hydrogen atom, for example, the polyglycol ethers of fatty alcohols or alkyl phenols, as well as polyglycol esters of fatty acids. This also includes compounds with a plurality of solubilizing hydroxyl groups in the molecule, such as, for example, partial ethers of higher alcohols or partial esters of fatty acids and polyvalent alcohols or their internal or external etherification products. Known emulsifying agents of this type are the fatty acid monoglycerides as well as the fatty acid esters of sorbite or its inner ethers.

The concentration of the surface-active substance in the aqueous heavy liquid can vary within wide limits, approximately from 0.1 to 5%.

The sequence of the steps in the preparation of the urea adducts and/or the dispersions may also be of importance with regard to the nature of the reaction product and the separating action. It has already been stated that completely formed adducts can be dispersed in the heavy liquid or that they can be formed only upon combination of the mixture of substances to be separated with the heavy liquid. Similarly, other steps, such as the addition of organic, water-soluble, or water-insoluble solvents, as well as the addition of surface-active substances can be carried out in different sequences. Both the surface-active substances, as well as the solvents, can be added to the mixture of organic substances to be separated or to the aqueous phase. Their addition furthermore can also be effected only after the formation of an adduct with the aqueous urea solution has already taken place. It may be advisable to carry out the formation of the adduct in steps, and in this connection to admit the surface-active substances essentially to the first steps, i. e., the adduct is formed in the presence of relatively small quantities of heavy liquid which contains a relatively large amount of surface-active substance and thereupon this dispersion is diluted to the desired concentration with further heavy liquid which does not contain any surface-active substance or contains same only in slight concentration.

The dispersion is separated into layers of different specific gravity in an imperforate centrifuge. As the lighter layer, there is removed the non-added mixture component distributed in the dispersion in the form of fine droplets, while the solid adduct remains in the heavy liquid and forms the heavy layer together with same. The separation of the dispersion into layers of different specific gravity can be carried out continuously in the centrifuges. It is advisable to accelerate the dispersion entering the centrifuge to the peripheral velocity with the avoidance of turbulence. After separation of the liquid products from the urea adducts dispersed in the heavy liquid, the compounds forming adducts with the urea can be recovered in a simple manner by heating. At this point of the process, a fractionation is again possible by heating the dispersion to a temperature at which only a part of the urea adducts is decomposed. A dispersion of solid added and liquid, non-added mixture components is again formed, which mixture is separated in the manner described.

Partial splitting of the adducts (repeated fractionation) or complete splitting of the adducts (removal of the added substance) can also be effected by diluting the dispersion of solid adducts with urea-free heavy liquid.

After the separation of the solid urea-adducts from the heavy liquid or after the splitting up of the adducts and removal of the extract, there is obtained a heavy liquid, which, possibly after readjustment of the specific gravity or of the amount of surface-active substance or urea contained therein, is returned to the process.

The organic compounds obtained can contain small portions of solvent, water or surface-active substance, and are freed from these admixtures in the known manner, for example, by heating, distilling, washing with water, etc. The starting material can be split into fractions by fractional addition or decomposition, and by repetition of the method on the extract or residual oil.

Although continuous separation represents the preferred embodiment of the process, most of the examples describe batch tests which can be carried out rapidly and without great expenditure of time, and therefore are more suitable as preliminary tests for the determination of optimum conditions than are continuous processes.

The following examples are given by away of illustration and not limitation.

*Example 1*

200 grams train oil fatty acid (acid number=203; saponification number=207; iodine number=150) were stirred for 2 hours at 20° C. with 400 grams of an aqueous 16% aluminum sulfate solution which was saturated with urea at 20° C. ($d_{20}$=1.25). There was obtained a fluid dispersion, a sample from which was centrifuged in tubes. Two layers were formed, an upper layer consisting of the residue (60% of the fatty acid, iodine number=168), and a lower layer which was formed of the aqueous phase with the urea adduct suspended mainly therein. The urea adducts did not form any sediment in the aqueous phase, and upon heating gave an extract having an iodine number of 104.

*Example 2*

200 grams of the train oil fatty acid mentioned in Example 1 were cooled with agitation within a few hours from 30° C. to 20° C., together with 600 grams of an aqueous solution which contained 5% $Al_2(SO_4)_3$, 5% $MgSO_4$, 50% urea and 0.1% dodecyl-diethyl-benzyl-ammonium chloride ($d_{20}$=1.26). The fluid mixture produced gave, separated in accordance with Example 1 in the tube centrifuge, 123 grams liquids with an iodine number of 167. From the aqueous phase located below it, fatty acids which had an iodine number of 89 after washing with water separated upon heating.

*Example 3*

100 grams linseed oil fatty acid (acid number=193; saponification number=200; iodine number=156) were cooled within a few hours, while agitating, from 30° C. to 20° C. with 285 grams of an aqueous 16% aluminum sulfate solution which was saturated with urea at 20° C. ($d_{20}=1.25$) and to which there had been added 15 grams 16% aluminum sulfate solution. The fluid dispersion formed after being broken up in a tube centrifuge and further treated in accordance with Example 1 gave 55 grams of residue of an iodine number of 176. The extract had an iodine number of 92.

*Example 4*

200 grams of the fraction of a synthetic fatty acid from paraffin oxidation (acid number=230; saponification number=240; iodine number=30; solidification point =11.2° C.) were stirred for 40 minutes at 20° C., diluted with 5% of 16% aluminum sulfate solution, and thereupon centrifuged in tubes after 1.2 grams of a 50% technical sodium salt of the fatty alcohol sulfate of the chain length $C_{12}$–$C_{14}$ had been stirred in.

The fluid portions which separated (142 grams) had a solidification point of 7.5° C. and an iodine number of 32. The resin addition compounds present in the aqueous solution after decomposition by heating, gave a fatty acid having a solidification point of 16.3° C. and an iodine number of 26.

*Example 5*

200 grams hardened sperm oil (iodine number=58; solidification point =24.2° C.) were stirred for 1.2 hours at 30° C. with twice the quantity of the urea solution described in Example 4, and the fluid mixture produced was separated at the same temperature in a tube centrifuge. The portions which did not form adducts with the urea formed the upper layer (133 grams, iodine number =59, solidification point=17.5° C.). The addition products suspended in the lower layer after their decomposition by heating and washing, gave a fraction with an iodine number of 51 and a solidification point of 24.2° C.

*Example 6*

200 grams tall oil distillate (39% resin acids and 8.0% non-saponifiable matter) were stirred for several hours with 600 grams of an aqueous solution which contained 10% $MgSO_4$ and 50% urea ($d_{20}=1.26$), the mixture being cooled from 30° C. to 20° C. The dispersion produced was centrifuged in tubes after 6 grams of a 30% technical solution of the sodium salt of an alkyl sulfonate had been stirred in it. There separated in this connection as the lighter layer 152 grams of a non-added fraction (43% resin acid, 11.0% non-saponifiable matter). The aqueous lower layer in which the urea addition compounds were suspended, upon heating gave 46 grams extract, which, after washing out with water, had 11% resin acid and 3.5% non-saponifiable matter.

*Example 7*

200 grams of a petroleum hydrocarbon were diluted with 100 grams methylisobutylketone and stirred intensively for several hours at 20° C. with 800 grams of a 20% $NaNO_3$ solution which had been saturated at 20° C. with urea ($d_{20}=1.23$), and 6 grams of a 30% technical solution of the sodium salt of an alkyl sulfonate. A dispersion was formed in the heavy liquid which contained the adducts and non-adduct-forming components. If the addition of the methylisobutylketone is omitted, urea adducts are not formed. The mixture produced separated, upon being centrifuged, into a lighter layer and a heavier aqueous layer, which contained the crystallized urea addition product suspended therein. From the fluid residue obtained as upper layer, the methylisobutylketone was distilled off. The aqueous layer with the addition compound contained therein, after heating, removal of the hydrocarbon which separates, and expulsion of traces of methylisobutylketone, gave the extract.

Starting hydrocarbon _____ $n_D^{20}=1.4768$
Residue (69%) _____ $n_D^{20}=1.4852$
Extract (31%) _____ $n_D^{20}=1.4642$

*Example 8*

100 kilograms of a fatty acid fraction of vegetable fatty acids (acid number=198; saponification number= 201; iodine number=105) were cooled within several hours from 30° C. to 20° C. while stirring with 300 kilograms of a urea solution. The urea solution had been prepared by saturating a 20% aluminum sulfate solution with urea at 20° C. ($d_{20}=1.26$) and thereupon diluting the same with 5% of the same aluminum sulfate solution and 5% isopropyl alcohol. A thinly liquid dispersion was produced, which was continuously separated in a solid-jacket centrifuge provided with stripping or peeling discs into non-added fatty acids and a suspension of crystallized urea addition products in the aqueous solution.

The through-put was 52 kilograms dispersion per hour. 200 kilograms dispersion, after heating of the urea addition compounds and washing out of the fatty acid fractions with water, gave:

31.8 kilograms residue of an iodine number of 117; and 17.3 kilograms extract of an iodine number of 74.

*Example 9*

To 100 kilograms of the vegetable fatty acid mentioned in the preceding example, there were added at 20° C. 400 kilograms of an urea solution which had been prepared from a solution containing 10% $MgSO_4$ and 10% $Al_2(SO_4)_3$ by saturation with urea at 20° C. ($d_{20}=1.26$), and, after the addition of 2250 grams of a 30% technical solution of the sodium salt of an alkyl sulfonate, was stirred intensively for several hours at 20° C. The fluid dispersion produced, containing the liquid, non-added, and the solid, added mixture components, was separated in the manner described in the preceding example in a centrifuge as a result of which 68 kilograms non-added, fatty acids (residue) of an iodine number of 117 were obtained. The suspension of solid, addition compound in aqueous phase obtained was broken up, by heating, into the added fatty acids (extract) of an iodine number of 63 and the urea solution used. The hot urea solution used when stirred with the non-added fatty acids (residual oil) for a few hours, gave, upon slow cooling to 20° C., a dispersion, which, after the addition of 1020 grams of the aforementioned, technical Na-alkylsulfonate solution, could again be separated as previously in the centrifuge into non-added, fatty acid on the one hand (42 kg.; iodine number=133) and the aqueous phase on the other. The fatty acids obtained therefrom, after their separation, purification, and working, showed an iodine number of 87. They can be recycled again and added to the starting fatty acid.

*Example 10*

50 kilograms of a high-molecular alcohol of the chain length $C_{11}$–$C_{15}$, solidification point 18.9° C., which had been obtained by catalytic reduction of a fatty acid from paraffin oxidation, and 150 kilograms of an aqueous solution which contained 7.5 kilograms $MgSO_4$, 7.5 kilograms $Al_2(SO_4)_3$, 75 kilograms urea and 150 grams of a 30% technical solution of the sodium salt of an alkyl sulfonate ($d_{20}=1.26$), were stirred intensively together for several hours at 20° C. until a fluid mixture containing urea addition compounds had been formed, which was then separated in a plate centrifuge. As lighter liquid 42 kilograms of non-added alcohols (solidification point=18.2° C.) were separated off. The heavy liquid which was separated consisted of an aqueous phase with urea addition compounds suspended therein. The alcohols isolated therefrom had a solidification point of 24.3° C.

We claim:

1. In the method for the separation of mixtures of organic compounds by urea adducts formation, the improvement in the separation of the solid urea adduct from the liquid non-adduct forming components which comprises subjecting a dispersion of the solid adduct and liquid non-adduct forming components, in an aqueous solution having its specific gravity increased to a value at least substantially equal to the specific gravity of the solid adduct by the addition of a salt chemically inert to the components forming the dispersion, to centrifugal action in an outwardly confined zone at a temperature at which the aqueous phase of said dispersion would have, in the absence of said salt, a specific gravity less than the specific gravity of the solid adduct, to thereby form a lighter phase containing the liquid non-adduct forming components and a heavier phase containing the solid adduct suspended in the aqueous solution.

2. Improvement according to claim 1 which includes forming said dispersion by mixing the mixture of organic compounds to be separated with an aqueous urea solution containing said salt.

3. Improvement according to claim 1, in which the heavier phase containing the suspended urea adduct is separated from the lighter phase, heated to a temperature sufficient to separate a portion of the adduct forming component from the adduct and thereby form a dispersion of the solid adduct and separated liquid portion in the aqueous solution containing said salt and in which the dispersion is subjected to centrifugal action in an outwardly confined zone to thereby form a lighter phase containing the separated liquid and a heavier phase containing the adduct suspended in the aqueous solution.

4. Improvement according to claim 1, in which said dispersion additionally contains a surface active material chemically inert with respect to the other components of the dispersion.

5. Improvement according to claim 4, in which said surface active material is present in a dispersion in amount between about 0.1–5 weight percent.

References Cited in the file of this patent

UNITED STATES PATENTS

| | | |
|---|---|---|
| 2,302,382 | Scott | Nov. 17, 1942 |
| 2,518,677 | Garner et al. | Aug. 15, 1950 |
| 2,642,423 | Gorin | June 16, 1953 |
| 2,658,060 | Arnold et al. | Nov. 3, 1953 |